United States Patent Office 3,486,587
Patented Dec. 30, 1969

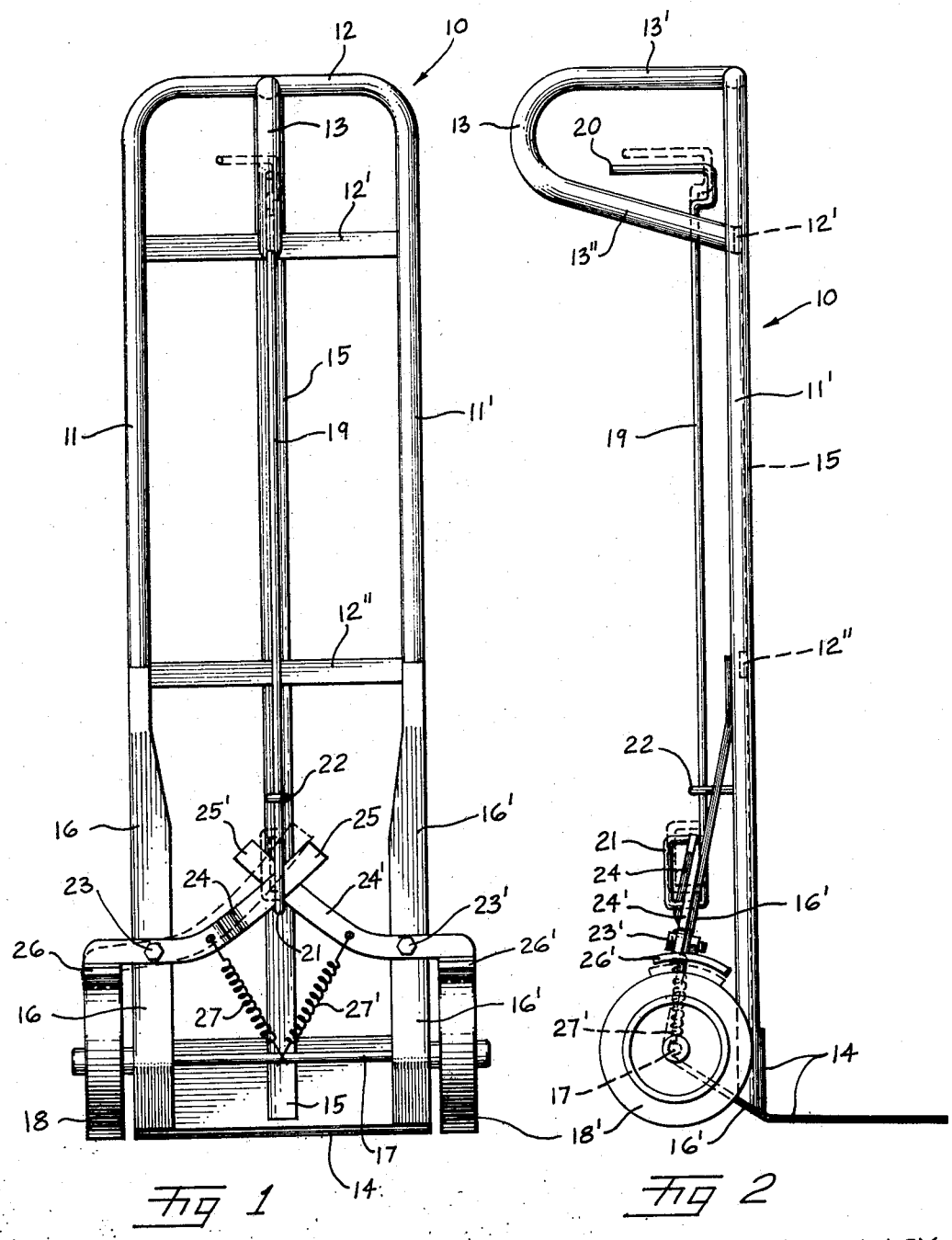

3,486,587
HAND TRUCK BRAKE
George W. Malloy, 1507 E. Edenton St.,
Raleigh, N.C. 27610
Filed Dec. 26, 1967, Ser. No. 693,380
Int. Cl. B60t 1/04
U.S. Cl. 188—22     5 Claims

ABSTRACT OF THE DISCLOSURE

In abstract, a preferred embodiment of this invention is a hand truck with brakes on both wheels with a single brake lever which applies either of the brakes independently or both together.

---

This invention relates to vehicles having brakes and more particularly to hand trucks with wheel brakes.

In the past, difficulty has been encountered in moving heavy loads across inclined surfaces with hand trucks. At times, it has been extremely difficult if not impossible to hold a heavy load when traveling down an inclined surface such as a truck unloading ramp. This is true not only around warehouses where hand trucks are commonly used but also in and around retail establishments and other delivery points.

Attempts have been made to overcome these problems by applying hand operated brakes to the trucks. It has been found, however, that having a single brake lever for applying both brakes in unison is unsatisfactory since this only gives stopping power and does not allow for maneuvering, which is particularly necessary under heavy load conditions. In utilizing the unison brake principle, the only way to change direction is to release the brakes, maneuver, and then reapply them hopefully in quick enough sequence that the load will not get out of control.

In addition to the unison type brakes, other attmepts have been made to develop brakes which may be independently applied to each wheel. These attempts have included actuating handles for each wheel so that one hand of the operator may operate one brake and his other hand may operate the other brake. This type of braking system is fine so long as the load rides on the truck without additional balancing or holding. When a large bulky load is placed on the truck, however, the operator must hold such truck with one hand and balance the load with his other hand. The situation produced is the undesirable choice of applying only one brake which will swing the load and vehicle around completely out of control, or releasing his hold on the load to brake both wheels which will cause the load to be lost. The solution to this predictment is to have one person operating the truck and another holding the load. This, of course, doubles the labor force needed and places the employer back where he was prior to acquiring hand trucks with brakes.

The present invention has been devoloped after much research and study into the above mentioned problems and is designed to allow a single operator to handle and manipulate large bulky loads with only one hand on the truck. This is accomplished by providing a braking system operated through the manipulation of a single handle which selectively activates either brake or both of the brakes together as well as allowing progressively more braking pressure to be applied selectively to one wheel or the other.

It is, therefore, an object of the present invention to provide on a vehicle having at least two wheels, a braking mechanism which allows a brake associated with each wheel to be applied independently through the manipulation of a single operating handle.

Another object of the present invention is to provide a hand operated braking system for a land vehicle so constructed as to allow a single control to selectively apply more braking pressure to one wheel than to another.

A further object of the present invention is to provide a braking system for a hand truck which allows complete control of the device from a single point.

Another object of the present invention is to provide a hand braking system for a hand type truck which may be readily attached to existing units and which allows complete braking control from a single point.

An additional object of the present invention is to provide a hand truck braking system which combines all of the advantages of independent brake and unison brake systems without the disadvantages of either.

Other objects and advantages of the present invention will become apparent and obvious from a study of the following description and the accompanying drawings which are merely illustrative of the present invention.

In the drawings:

FIG. 1 is a front elevational view of a hand truck in vertically disposed position utilizing the braking system of the present invention; and FIG. 2 is a side elevational view thereof.

With further reference to the drawings, a hand truck indicated generally at 10 is provided composed of two elongated, generally parallel load supporting frame members 11 which are joined at intermediate points by cross frame members 12, 12′ and 12″. Fixedly secured to members 12 and 12′ in such a manner as to be downwardly disposed when frame members 11 are horizontally disposed is a generally U-shaped handle 13 including elongated portion 13′ and 13″.

To the end of truck 10 opposite handle 13 is fixedly secured a load engaging lip or flange 14. Extending longitudinally from frame members 12 to flange 14 is a load bearing central frame member 15.

Fixedly secured to one of the parallel frame members 11 is an axle suport bracket 16. A similar bracket 16′ is fixedly secured in like manner to the second frame member 11. Fixedly secured to and disposed between support brackets 16 and 16′ is an axle 17. On the ends of axle 17 are rotatively mounted wheels 18 and 18′.

A brake control arm 19 is provided which terminates at one end in a handle 20 and at the other end in a rectangular, box-shaped linkage 21.

The control arm 19 is disposed parallel to the central frame member 15 and is slideably mounted at one point through the elongated portion 13″ of handle 13. It is slideably supported at a second point by a U-shaped bracket 22 which is fixedly secured to said central frame member 15, particularly as disclosed in FIG. 2. Thus it can be seen that brake control arm 19 can move not only in a path parallel to the longitudinal axle of the hand truck but also can be rotated a partial turn in either direction which is advantageous as will be hereinafter described.

Pivotably attached to support bracket 16 by a means such as bolt 23 is a brake operating arm 24. Pivotably attached in similar manner to bracket 16′ is brake operating arm 24′ secured in operative position by means such as bolt 23′. Both end 25 of arm 24 and end 25′ of arm 24′ pass through and are disposed loosely within linkage 21 of control arm 19.

Fixedly secured to the end of arm 24 opposite end 25 is a brake shoe 26. To the end of arm 24′ opposite end 25′ is fixedly secured brake shoe 26′. Although brake shoes 26 and 26′ are called for as being fixedly secured to their respective brake control arms, it is obvious that these shoes could be flexibly mounted on the arms to make the brakes self-adjusting relative to matching the contour of their associated wheels 18 or 18′.

Tension springs 27 and 27' are attached at one end, respectively, to arms 24 and 24'. The other end of these springs are secured to the central portion of axle 17.

When, during use of a hand truck incorporating the present invention, it becomes desirable or necessary to apply the brakes to both wheels in unison, the operator simply squeezes handle 20 toward portion 13'. This slides brake control arm 19 and its associated linkage 21 upwardly as disposed in the drawings. Said linkage forces end portions 25 and 25' or arms 24 and 24' upwardly giving a downward movement to brake shoes 26 and 26' because of the pivoting action of bolt means 23 and 23'. Thus it can be readily seen that both brakes will engage their respective wheels to impede the movement of the truck and any load being carried thereon.

If it is desired to brake only one wheel, as for example wheel 18, as the handle 20 is squeezed toward portion 13', it is at the same time twisted as shown in dotted lines in FIG. 1. This twisting motion rotates control arm 19 which displaces linkage 21. This displacement of linkage 21 to the left (as oriented in the drawings) allows end 25' of brake operating arm 24' to move downwardly thus raising away from wheel 18', brake shoe 26'. At the same time, this displacing motion of the linkage raises end 25 of brake operating arm 24 to lower, due to the pivoting action about bolt 23, brake shoe 26 into contactive engagement with wheel 18. Thus is can readily be seen that through the manipulation of a single handle either both brakes or a single brake can be selectively applied.

If, or course, it is desired that brake 26' be applied to wheel 18', handle 20 should be twisted in a direction toward said wheel 18' which reverses the action hereinabove described for the applying of brake 26 to wheel 18.

In many instances, it is desirable to apply both brakes but, to assist in controlling the truck and its load, one brake should impede rotation of its related wheel more than the other brake. This is particularly helpful in maneuvering heavy loads down inclined surfaces and the like. This progressive braking of one wheel more than another is accomplished simply by imparting only a small amount of twist to handle 20 which applies the brake in the direction of the twist harder against its related wheel than the opposite brake is applied to its wheel. Of course, the amount of braking pressure applied to either or both wheels is readily controlled by increasing or decreasing the pressure on handle 20 toward portion 13'. Whenever this braking pressure is decreased or released, the tensioning springs 27 and 27' bias their respective brake operating arms toward the off brake position as indicated by the solid lines in FIG. 1.

From the above, it is obvious that the present invention has the advantage of allowing complete control over the braking of a pair of wheels mounted on a vehicle. This complete control is of additional advantage in that it is operated from a single location which frees the hand of the person using the vehicle so that he may balance loads, open doors or the like with his other hand. The present invention also has the advantage of being inexpensive to produce and simple to install while at the same time, for all practical purposes, being maintenance free. This invention further has the advantage of allowing varying amounts of braking pressure to be selectively used in conjunction with the wheels thus allowing complete control over the vehicle by the manipulation of a single operating handle.

The terms "upper," "lower," "left," "right" and so forth have been used herein merely for convenience in the foregoing specification to describe the hand truck brake and its parts as oriented in the drawings. It is to be understood, however, that these terms are in no way limiting to the invention since the truck may obviously be disposed in many different positions when it is in actual use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. In a vehicle having a frame and separate brake means associated with at least two wheels rotatively mounted on said frame, the improvement comprising: a pair of brake means operating arms pivotably attached, one to the frame adjacent each of said wheels with ends thereof disposed adjacent to each other; a linkage loosely mounting said ends of said arms; and a brake control arm secured unsymmetrically at one end to said linkage, said arm being slideably and rotatively mounted whereby when said arm is moved longitudinally away from said wheels, the brake operating arms will pivot to engage the brake means with the wheels and when the control arm is rotated in a direction toward one of the wheels, the unsymmetrically attached linkage will pivot the brake operating arm adjacent said last mentioned wheel a greater distance than the other arm is pivoted thus applying a single brake selectively.

2. In a braking system for a hand truck type vehicle having a pair of generally parallely disposed frame members, an axle secured laterally across and to one end of said frame members, a frame handle secured to said members adjacent their other end; and a pair of wheels rotatively mounted, one on each end of said axle adjacent each of said frame members, the improvement comprising: a pair of brake operating arms pivotably attached, one to each frame member and so disposed that one end of each arm is adjacent a wheel and the other end of the arms are adjacent each other; a linkage loosely mounting the ends of said arms opposite said wheels; wheel engaging brake means mounted on the end of said arms adjacent said wheels; and a brake control arm fixedly secured unsymmetrically at one end to said linkage and having a handle fixedly secured to the other end, said control arm being slideably and rotatively mounted so that its handle end is disposed adjacent the frame handle whereby when said control arm is moved longitudinally away from said wheels, the brake operating arms will pivot to engage the brake shoes with the wheels and when the control arm is rotated in a direction toward one of the wheels, the unsymmetrically attached linkage will pivot the brake operating arm adjacent said last mentioned wheel a greater distance than the other arm is pivoted thus applying a single brake.

3. The braking system of claim 2 wherein tensioning means are provided to bias said brakes toward their disengaged position.

4. The braking system of claim 3 wherein the tensioning means are springs operatively secured to the brake operating arms.

5. The braking system of claim 2 wherein the linkage is a generally rectangular shaped member.

References Cited

UNITED STATES PATENTS

| 1,224,826 | 5/1917 | Wiser | 188—16 |
| 2,821,265 | 1/1958 | Morrison | 188—16 |
| 3,187,845 | 6/1965 | Ashley | 188—16 |
| 3,276,550 | 10/1966 | Honeyman | 188—19 |

FOREIGN PATENTS

| 203,571 | 6/1939 | Switzerland. |

MILTON BUCHLER, Primary Examiner

T. W. BUCKMAN, Assistant Examiner

U.S. Cl. X.R.

188—29